3,087,912
PROCESS FOR THE PRODUCTION OF CROSS-LINKED PLASTICS OF HIGH MOLECULAR WEIGHT
Kuno Wagner and Otto Bayer, Leverkusen, and Hans Holtschmidt, Cologne-Stammheim, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Sept. 8, 1958, Ser. No. 759,423
Claims priority, application Germany Sept. 13, 1957
7 Claims. (Cl. 260—67)

The present invention relates to a process for the production of cross-linked plastics, and more particularly, to a new method for the production of cross-linked polyurethane plastics.

It is known in the art to prepare high molecular weight polyurethane plastics by the reaction of hydroxyl terminated polyesters and hydroxyl terminated polyester amides with organic diisocyanates. The hydroxyl terminated polyesters are obtained by the condensation of dicarboxylic acids and glycols. An excess of the glycol is used so that a polyester having terminal hydroxyl groups is produced. The hydroxyl terminated polyester amides are produced by reacting a dicarboxylic acid with an excess amount of an amino alcohol. The hydroxyl terminated polyesters and hydroxyl terminated polyester amides may be reacted with an excess amount of organic polyisocyanate to form an —NCO terminated isocyanate-modified polyester or —NCO terminated isocyanate-modified polyester amide. The —NCO terminated isocyanate-modified polyesters and polyester amides may then be reacted with cross-linking agents to form cross-linked polyurethane plastics. The cross-linking agents react with the isocyanate groups of two or more —NCO terminated isocyanate-modified polyesters or polyester amides to link the modified molecules together. The cross-linking agents by joining the molecules together form reaction products having a high molecular weight. The amount of cross-linking in the high molecular weight product produces certain physical properties in the final product. Such physical properties are, for example, rigidity and flexibility. The most common cross-linking agents used in the production of cross-linked polyurethanes are, for example, water, diamines, glycols, dicarboxylic acids and the like.

It is likewise known to produce cross-linked plastics or high molecular weight polyurethanes by reacting the —NCO terminated isocyanate-modified polyesters and —NCO terminated isocyanate-modified polyester amides with formaldehyde or agents which split off formaldehyde under suitable conditions. The —NCO terminated isocyanate-modified polyesters or —NCO terminated isocyanate-modified polyester amides are generally cross-linked by heating in the presence of formaldehyde or a formaldehyde liberating substance. The modified polyester is generally reacted with formaldehyde in the presence of an acid which acts as a catalyst. The reaction with formaldehyde modifies the physical properties of the —NCO terminated isocyanate-modified polyester, as for example, the rubber-like properties. The modified polyester may then be cured to form a polyurethane plastic having improved physical properties. Such physical properties are an increased resilience, a decreased permanent set, an increased softening point and usually an increased resistance to swelling by or solution in solvents, such as, for example, benzene. The isocyanate-modified polyesters and isocyanate-modified polyester amides which have been aftertreated with formaldehyde have not acquired any technical significance. The formaldehyde aftertreatment reaction products of polyesters and polyester amides have some improved physical properties but also have some poor physical and chemical properties. These poor properties have kept the formaldehyde treated isocyanate-modified polyesters and polyester amides from achieving any technical significance. The polyurethanes produced from the formaldehyde treated isocyanate-modified polyesters and polyester amides have poor ageing properties. The ester bonds of the formaldehyde treated polyurethanes are subject to hydrolytic and aminolytic degradation. Water at elevated temperatures, moist air, acids and bases are able to attack ester and amide bonds and cause degradation of the polyurethane product. The sensitivity of the polyurethane material is furthermore increased by the presence of the acid catalyst which is used in the cross-linking reaction with the formaldehyde. The emulsifier effect of the polyester acid or their salts which are initially formed by the degradation reaction of the polyurethane leads to an increased penetration of moisture into the polyurethane plastic. This penetration is shown by a high degree of swelling, a decrease in the strength properties of the polyurethane material and an accelerated hydrolysis of the N-methylene bridges.

It is therefore an object of the present invention to provide a process for the production of a cross-linked plastic of high molecular weight. A further object of the present invention is the production of a cross-linked polyurethane plastic of high molecular weight. A still further object of the present invention is the production of a cross-linked polyurethane plastic having improved physical properties. A more specific object of the invention is the production of polyurethane plastics having good ageing properties. A still more specific object of the present invention is to provide a process for the production of polyurethane plastics which are not sensitive to the common degradation reactants.

Generally speaking, the above objects as well as others are accomplished in accordance with this invention by reacting an hydroxyl terminated polyether of a molecular weight of at least 500 or an hydroxyl terminated polythioether of a molecular weight of at least about 500 with an organic polyisocyanate to produce an —NCO terminated reaction product. The —NCO terminated reaction product is then converted into a compound having terminal $NH_2$ groups. The $NH_2$ terminated reaction product is then reacted with formaldehyde or a formaldehyde liberating substance to produce cross-linked polyurethane plastics having improved physical and chemical properties. The cross-linked polyurethane plastics of the present invention may be produced by reacting an hydroxyl terminated polyether or an hydroxyl terminated polythioether with an excess of an organic polyisocyanate to form an —NCO terminated isocyanate-modified hydroxyl terminated polyether or polythioether. This chain lengthening modifying step of the hydroxyl terminated polyethers or polythioethers is carried out in a known manner. The chain lengthening reaction is carried out by using an excess of the organic polyisocyanates to react with the hydroxyl groups of the hydroxyl terminated polyethers or polythioethers. Additional bifunctional components may also be used concurrently with the organic polyisocyanate in the chain lengthening step. Such suitable bifunctional components are, for example, water, aliphatic and aromatic diamines, glycols and their derivatives which contain urea groups, urethane groups or the like in the molecule. In each case, the organic diisocyanate is to be used in such a quantity that the resulting reaction product is an —NCO terminated isocyanate-modified hydroxyl polyether or polythioether. In order to avoid undesirable secondary reactions, as, for example, branching, the chain lengthening modification is preferably carried out at a temperature below about 100° C. and advantageously the modification is carried out at a temperature of from about 70° C. to about 90° C.

The —NCO terminated isocyanate-modified polyethers and —NCO terminated isocyanate-modified polythioethers are further reacted to produce an NH₂ terminated isocyanate-modified reaction product which may be used in accordance with the invention. The reaction of the —NCO terminated isocyanate-modified polyether or polythioether to form the NH₂ terminated isocyanate-modified reaction product is carried out by reacting an excess amount of the component capable of reacting with the terminal —NCO group of the —NCO terminated isocyanate-modified polyether or polythioether to form a compound having terminal NH₂ group. The component capable of reacting with the terminal —NCO group of the modified polyether or polythioether may be a compound having two or more primary amine groups. The compound having two or more primary amine groups will react with the terminal —NCO group to form an amide group linking the —NCO terminated isocyanate-modified polyether or polythioether and the polyamine. One of the amine groups of the polyamine is therefore reacted with the terminal —NCO group forming a compound having at least one free terminal primary amine group. The component capable of reacting with the terminal —NCO group may also be a component, such as, ammonia which has only one nitrogen atom but which will react with the terminal —NCO group to form an amide group and also will have a terminal primary amine group. Compounds having an amide group and a terminal primary amine group are, for example, monosubstituted urea compounds. The primary amines forming the terminal primary amine group of the modified polyether or polythioether according to the invention may be bound to an aliphatic, cycloaliphatic, or aromatic group. Compounds having terminal amide groups, semicarbazide groups, NH₂ groups of triazine derivatives, dicyandiamides and the like may also be used in the invention in place of the primary amines.

The amine terminated reaction products prepared according to the invention are storage stable, are thermoplastic, and may be worked on mixing rollers, such as, a rubber mill. The cross-linking of the amine terminated reaction product to form the cross-linked polyurethane plastic takes place, according to the invention, by incorporating formaldehyde, substances capable of splitting off formaldehyde or compounds with at least two methylol groups, which is necessary may be etherified into the NH₂ terminated reaction produce. The cross-linking agents are incorporated by rolling into the NH₂ terminated modified polyethers or polythioethers and homogeneously distributed therein. It may be preferable to add fillers, such as, for example, carbon black, clay, silica, mica, asbestos, and whiting and the like and homogeneously distribute the filler into the NH₂ terminated modified polyether or NH₂ terminated modified polythioether in the same mixing step with the cross-linking agent. Diluents, coloring matter or substances which prevent sticking or mixing rollers can be added, if desired.

It is an advantage of the present invention that it is possible in many cases to work without an acid catalyst in the cross-linking reaction. If it is preferred to use acid hardening agents in the final polyurethane plastic, it is preferable to incorporate the known acid hardening agents, such as, for example, inorganic or organic acids, such as phosphoric acid or p-toluene sulfonic acid, or compounds splitting off acids, such as ammonium chloride, ammonium nitrate and ammonium phosphate, acid salts, zinc chloride or complex salts of zinc chloride into the reaction mass by rolling after the cross-linking agent has been homogeneously distributed in the modified polyether or polythioether.

If acid hardening catalysts are added to the polyurethane plastic, it may be preferable to add organic bases or metal oxides, such as, for example, zinc oxide and magnesium oxide to neutralize the acids which are liberated in the reaction.

The reactivity with formaldehyde or agents which split off formaldehyde and the NH₂ terminated isocyanate-modified polyethers and polythioethers which are used in the present invention is very pronounced as is apparent from the fact that very small quantities of formaldehyde are sufficient to convert the storage stable intermediate having terminal NH₂ groups into a cross-linked polyurethane plastic. In many cases, the addition of from about 0.4 percent to about 1.5 percent calculated free formaldehyde is sufficient to cross-link the polyurethane plastic. The quantity of formaldehyde used also depends on the reactivity of the terminal groups and the efficiency of the acid catalyst.

According to one particular embodiment of the present invention, a further quantity of an organic polyisocyanate or substance which splits off an organic polyisocyanate under suitable conditions, such as, for example, a dimer of 2,4-tolylene diisocyanate or a blocked polyisocyanate which has been reacted with a phenol may be incorporated into the reaction mass by rolling together with the formaldehyde, agents splitting off formaldehyde or methylol compounds. By following this embodiment the degree of cross-linking by means of urea, biuret or allophanate group will be increased.

The cross-linked polyurethane plastic storage stable sheets may be vulcanized with simultaneous shaping at elevated temperatures, preferably at a temperature from about 100° C. to about 160° C.

Any suitable hydroxyl terminated polyether or hydroxyl terminated polythioether having a molecular weight of at least about 500 may be used in the present invention. Examples of such suitable hydroxyl terminated polyethers are, for example, polyalkylene ether glycols prepared by polymerization of suitable monomeric cyclic ethers, such as, propylene oxide, ethylene oxide, trimethylene oxide, tetrahydrofuran and the like under the influence of suitable catalyst. The co-polymers of these polymerized products may further be polymerized with each other, with ethylene oxide, and also the co-polymers prepared by polyaddition of alkylene oxides with monohydric and polyhydric alcohols. The polyethers having terminal hydroxyl groups may also be prepared by oxyalkylation of polyhydric alcohols with alkylene oxides under the influence of suitable catalysts. Alkylene oxides which have been used heretofore to produce polyethers having terminal hydroxyl groups generally have been the low molecular weight alkylene oxides. Examples of such low molecular weight alkylene oxides are ethylene oxide, propylene oxide, butylene oxide and the like. Examples of such suitable polyhydric alcohols are ethylene glycol, propylene glycol, butylene glycol, glycerine, trimethanol propane and the like.

Examples of such suitable hydroxyl terminated polythioethers are the polycondensation products of thioether glycols, such as, for example, thiodiglycols, such as, hydroxymethyl thioether glycol, hydroxyethyl thioether glycol, hydroxypropyl thioether glycol and the like, and the oxyalkylation of hydroxythioethers with alkylene oxides by heating in the presence of suitable catalyst. The hydroxyl terminated polyethers or hydroxyl terminated polythioethers are compounds having at least two hydroxyl groups capable of reacting with an isocyanate group. The hydroxyl terminated polythioethers may also be produced by condensing thiodiglycols with polyhydric alcohols at an elevated temperature and in the presence of suitable catalyst. While any polyether or polythioether with a molecular weight exceeding about 500 is suitable for the process of the invention it is preferred to employ polyethers or polythioethers with a molecular weight within the range of about 1,000 and about 5,000, or more especially within the range of about 1,500 and about 2,500. The hydroxyl number of these compounds shall be within the range of about 20 and about 150, more preferably within the range of about 35 and about 70.

Any suitable organic polyisocyanate may be used in the present invention. Examples of such suitable organic polyisocyanates are, for example, aliphatic diisocyanate, such as, trimethylene diisocyanate, tetramethylene diisocyanate, pentamethylene diisocyanate, hexamethylene diisocyanate, ethylene diisocyanate, cycloaliphatic diisocyanates, such as, 1,4-cyclohexane diisocyanate and aromatic diisocyanates, such as, m-phenylene diisocyanate, p-phenylene diisocyanate, tolylene 2,4-diisocyanate, tolylene-2,6-diisocyanate, and mixtures thereof, 1,5-naphthalene diisocyanate, and 4,4'-diphenyl methane diisocyanate and mixtures of aliphatic diisocyanates and aromatic diisocyanates, such as, a mixture of hexamethylene diisocyanate and 4,4'-diphenyl methane diisocyanate and the like may be used in the invention.

Any suitable compound capable of reacting with an —NCO terminated isocyanate modified polyether or polythioether to form an $NH_2$ terminated reaction product may be used in the invention. Examples of such suitable modified compounds are ammonia, hydrazine, aliphatic diamines, such as, ethylene diamine, propylene diamine, and hexamethylene diamine, aromatic diamines, such as, 4,4'-diamino-diphenyl methane, 4,4'-diamino diphenyl sulphone, benzidine, 3,3'-dichlorobenzidine, 3,3'-dinitrobenzidine, 3,3'-dichloro-4,4'-diaminodiphenyl methane, 3,3'-dinitro-4,4'-diaminodiphenyl methane, ortho-toluidine, meta-toluidine, para-toluidine, and the like. Compounds which may also be suitable for the present invention are N,N-dihydroxyethyl urea and melamine derivatives, such as, for example, N,N-dihydroxyethyl melamine.

Any suitable cross-linking agent may be used in the present invention. Examples of such suitable cross-linking agents are formaldehyde in concentrated solutions, polymerides of formaldehyde, such as, paraformaldehyde, and trioxane, compounds containing a reactive methylol group or groups, such as, dimethylol urea, trimethylolmelamine, dimethylol phenol, dimethylol cresol, hexamethylol melamine or the methylol ethers thereof, polymethylol compounds of hexamethylene diurea, adipic acid dimethylol amide and methylol ethers thereof tetramethylolhydrazodicarbonamide, dimethyloluron dimethyl ether, copolymerization products with incorporated methacryamide-methylol methyl ethers, and polymethylol compounds of polycaprolactam and methylol ethers thereof, hexamethylene tetramine and the like.

In addition to improved aging resistance, the process of the invention also offers technical processing advantages which are not obtained in the formaldehyde cross-linking of isocyanate-modified polyesters or polyester amides. For example, in the present invention substances which split off formaldehyde may be introduced in very finely divided form, such as, for example, semi-acetals. In the polyester and polyester amine cross-linking this is not possible as the ester and amide bonds are broken down by alcoholysis. Because of the increased reactivity of the terminal groups which react with formaldehyde or agents which split off formaldehyde, it is possible to operate with substantially smaller quantities of cross-linking agents than was previously the case. In this way, a more or less rapid further cross-linking, after the vulcanization process due to having an excess amount of formaldehyde present is prevented. The cross-linking reactions caused after the vulcanization considerably impair the material properties of the polyurethane plastic.

The cross-linked high molecular weight products produced by the present invention may be used for the production of oil or petroleum resistant articles, such as, for example, gaskets, packings, hose, diaphragms for pumps and the like. The cross-linked plastics may also be used in the production of rollers, blankets and stereos for use in the printing industry, to prepare protective sheathings for insulated electric cables, in making balls for games, tires, elastic threads conveyor or transmission belting and other like articles having physical properties resembling rubber.

In order to better describe and further clarify the invention, the following are specific embodiments thereof; the parts being by weight if not otherwise stated.

*Example 1*

About 500 parts by weight of a polybutylene ether glycol having an hydroxyl number of about 53 are dehydrated for a period of about 30 minutes at a temperature of about 130° C. in vacuo at from about 15 to about 20 mm. of mercury. When the temperature has fallen to about 120° C., about 56 parts by weight of hexamethylene diisocyanate are incorporated by stirring. After a period of about 50 minutes at a temperature of about 125° C. a solution of about 8.5 parts by weight of 4,4'-diaminodiphenyl methane in about 100 parts by weight of the above polybutylene ether glycol is added to the reaction mixture. After about 5 minutes the viscous melt is poured on to a support and heated for a period of about 18 hours at a temperature of about 100° C.

The storable material thus obtained and containing aromatic terminal amino groups is rolled out on the roller as a smooth sheet. For cross-linking purposes, about 80 parts by weight of carbon black and thereafter a well-powdered mixture of about 1.5 parts by weight of p-formaldehyde and 0.4 part by weight of zinc chloride are homogeneously incorporated into about 200 parts by weight of this material. The cross-linking takes place in about 30 minutes at a temperature of from about 140° C. to about 150° C. After being stored for a period of about 24 hours at room temperature, the material is heated again for about 10 hours at a temperature of about 100° C. The mechanical properties of a test sheet are as follows:

Thickness of the test sheet_____mm__ 4.2
Tensile strength_____kg./cm.$^2$__ 237
Breaking elongation_____percent__ 310
Shore hardness_____degrees__ 72
Elasticity _____percent__ 70
Permanent elongation_____do__ 2

If the cross-linking is carried out with about 2 parts by weight of paraformaldehyde without the addition of zinc chloride, a test plate is found to have a tensile strength of about 218 kg./cm.$^2$ and an elasticity of about 68%.

*Example 2*

About 400 parts by weight of an hydroxyl terminated polythioether having an OH number of about 53 which is produced by the self-condensation of thiodiglycol, are dehydrated for a period of about 30 minutes at a temperature of about 130° C. in vacuo at from about 15 to about 20 mm. of mercury. About 12 parts by weight of stearic acid are thereafter dissolved in the melt and the temperature is allowed to fall to about 100° C. At this temperature, about 67 parts by weight of tolylene-2,4-diisocyanate are added and the mixture is stirred until the temperature has again fallen to about 100° C. At this stage a solution of about 31.4 parts by weight of nitrobenzidine in about 200 parth by weight of the above polythioether is added all at once to the reaction mixture at a temperature of about 100°. After thorough stirring, the melt is poured on to a support and heated for about another 12 hours at a temperature of about 100° C.

The storable modified polythioether thus obtained is rolled out on a roller as a smooth sheet, and about 80 parts by weight of carbon black and a well-powdered mixture of about 1.5 parts by weight of paraformaldehyde and about 0.4 part by weight of zinc chloride are homogeneously incorporated into about 200 parts by weight of the said sheet. The cross-linking is carried out in about 30 minutes at a temperature of about 150° C. After storage for about 24 hours at room temperature, the sheet is again heated for about 10 hours at a temperature of about 100° C. The mechanical properties of a test sheet are as follows:

| | | |
|---|---|---|
| Thickness of the test sheet | mm | 3.5 |
| Tensile strength | kg./cm.² | 110 |
| Breaking elongation | percent | 350 |
| Load at 20% elongation | kg./cm.² | 9 |
| Load at 300% elongation | kg./cm.² | 96 |
| Elasticity | percent | 38 |
| Shore hardness | degrees | 62 |
| Permanent elongation | percent | 7 |

*Example 3*

About 500 parts by weight of a polythioether having an OH number of about 53 prepared by self-condensation of thiodiglycol, are dehydrated for about 1 hour at a temperature of about 130° C. and in vacuo at about 15 mm. of mercury. About 12 parts by weight of stearic acid are then dissolved in the melt and the temperature is allowed to drop to about 86° C. About 53.8 parts by weight of hexamethylene diisocyanate are then added. The mixture is stirred for about 15 minutes and the temperature reduced to about 78° C. At this stage, a solution of about 8 parts by weight of 4,4'-diaminodiphenyl methane in about 100 g. of the above polythioether is added all at once to the reaction mixture. The procedure as described in Example 1 is then followed. About 80 parts by weight of carbon black and a mixture of about 1.5 parts by weight of paraformaldehyde and about 0.4 part by weight of zinc chloride are homogeneously incorporated into about 200 parts by weight of the modified polythioether thus obtained. After pressing at a temperature of about 150° C., a test sheet having the following mechanical properties is obtained:

| | | |
|---|---|---|
| Thickness of the test sheet | mm | 4 |
| Tensile strength | kg./cm.² | 105 |
| Breaking elongation | percent | 360 |
| Elasticity | do | 50 |
| Permanent elongation | do | 4 |

*Example 4*

The procedure described in Example 2 is followed, using about 500 parts by weight of an hydroxyl terminated polythioether having an OH number of about 53, about 12 parts by weight of stearic acid and about 55.6 parts by weight of tolylene-2,4-diisocyanate. Finally, about 10 parts by weight of 4,4'-diaminodiphenyl methane in about 100 parts by weight of the same hydroxyl terminated polythioether having an OH number of about 53 are added, as described in Example 2 and the storable material is treated as described in that example. Before pressing at a temperature of about 150° C., about 80 parts by weight of carbon black and about 1.5 parts by weight of paraformaldehyde are dispersed homogeneously in about 200 parts by weight of the modified polythioether. A test sheet which has the following mechanical properties is obtained:

| | | |
|---|---|---|
| Thickness of the test sheet | mm | 3.5 |
| Tensile strength | kg./cm.² | 108 |
| Breaking elongation | percent | 480 |
| Load at 20% elongation | kg./cm.² | 3 |
| Load at 300% elongation | kg./cm.² | 58 |
| Shore hardness | degrees | 56 |
| Elasticity | percent | 40 |
| Permanent elongation | do | 7 |

*Example 5*

About 400 parts by weight of polypropylene ether glycol having an OH number of about 60 are dehydrated for about 30 minutes at a temperature of about 130° C. and in vacuo at from about 15 to about 20 mm. of mercury. The temperature is allowed to fall to about 88° C. and about 3.6 parts by weight of water and finally about 70 parts by weight of a technical mixture of 70% tolylene-2,4-diisocyanate and 30% tolylene-2,6-diisocyanate are added. After stirring for about 10 minutes at a temperature of about 90° C., a melt of about 1 part by weight of diamino-diphenyl methane is also added. The processing steps are followed in accordance with those steps described in Examples 1 to 4.

About 80 parts by weight of carbon black and a homogeneous mixture of about 3 parts by weight of paraformaldehyde and about 3 parts by weight of dimeric tolylene-2,4-diisocyanate are incorporated into about 200 parts by weight of the storable material. The mixture is cured for about 30 minutes at a temperature of about 150° C. A test sheet having the following mechanical values is obtained:

| | | |
|---|---|---|
| Thickness of the test sheet | mm | 4.2 |
| Tensile strength | kg./cm.² | 135 |
| Breaking elongation | percent | 320 |
| Shore hardness | degrees | 84 |
| Elasticity | percent | 42 |
| Permanent elongation | do | 8 |

The extraordinary resistance of the products obtained by the process of the invention to hydrolytic influences becomes quite clear from the following comparison. For example, a plastic which is prepared from an isocyanate-modified polyester and cross-linked with formaldehyde (in dices of 0.4 mm.) is changed into a wax-like material after being boiled in water for a period of about 56 hours, and the same material is converted into a brown resin after being boiled in water for about 162 hours. The acid number of the mother liquor and of the soild substances after being boiled in water corresponds to about ¼ to ⅓ of the theoretical value of all the acid components present in the polyester before boiling. However, the products produced according to the process of the present invention prove to be quite stable under the same boiling treatment. Furthermore the products of the present invention remain elastic and only swell to a slight degree. Even after this treatment by boiling in water, the plastics produced according to the present invention may be further treated for about 20 hours with about an 0.4 N-sodium hydroxide solution without obtaining the resinous or waxy condition of degradation of the aforementioned polyester prepared products.

It is to be understood that any of the hydroxyl terminated polyethers or hydroxyl terminated polythioethers or oganic diisocyanate or compounds capable of reacting with a terminal —NCO group to form a compound having terminal $NH_2$ groups or cross-linking or chain extending compounds or additives disclosed as operable herein can be substituted in the foregoing working examples for the specific compounds set forth therein.

Although the invention has been described in considerable detail in the foregoing examples for the purpose of illustration, it is to be understood that such detail is solely for this purpose and that variations can be made therein by those skilled in the art without departing from the spirit and scope of the invention except as is set forth in the claims.

What is claimed is:
1. A method for making high molecular weight cross-linked plastics which comprises reacting a member selected from the group consisting of polyhydric polyalkylene ethers and hydroxyl terminated polythioethers, said group member having a molecular weight of at least about 500, with an organic polyisocyanate to produce an —NCO terminated reaction product, reacting said —NCO terminated reaction product with a member selected from the group consisting of ammonia, hydrazine, aliphatic diamines, cycloaliphatic diamines, aromatic diamines, N,N,dihydroxyethyl urea, N,N,dihydroxy ethyl melamine and dicyandiamide to form an adduct having

—NH₂ groups; and thereafter reacting the resulting NH₂ terminated reaction product with formaldehyde to form a cross-linked high molecular weight plastic.

2. The process of claim 1 wherein said compound reacted with the —NCO terminated product is an aliphatic diamine.

3. The process of claim 1 wherein said compound reacted with the —NCO terminated product is benzidine.

4. The method of claim 1 wherein the organic polyisocyanate is reacted with a polyhydric polyalkylene ether.

5. The process of claim 1 wherein the organic polyisocyanate is reacted with a polythioether having terminal hydroxyl groups.

6. A method for making a polyurethane which comprises reacting a member selected from the group consisting of a polyhydric polyalkylene ether and an hydroxyl terminated polythioether, said group member having a molecular weight of at least about 500 with an organic polyisocyanate in a reaction mixture containing an excess of the polyisocyanate to form an —NCO terminated adduct, reacting the adduct with a member selected from the group consisting of ammonia, hydrazine, aliphatic diamines, aromatic diamines, cycloaliphatic diamines, N,N,dihydroxyethyl urea, dicyandiamide, and N,N,dihydroxyethyl melamine in a reaction mixture containing an excess of the said group member and thereafter reacting the second adduct having terminal NH₂ groups with formaldehyde.

7. The product prepared by reacting a member selected from the group consisting of a polyhydric polyalkylene ether and an hydroxyl terminated polythioether, said group member having a molecular weight of at least about 500 with an organic polyisocyanate to form an —NCO terminated adduct, reacting the adduct with a member selected from the group consisting of ammonia, hydrazine, aliphatic diamines, aromatic diamines, cycloaliphatic diamines, N,N,dihydroxyethyl urea, dicyandiamide, and N,N,dihydroxyethyl melamine to form an adduct having —NH₂ groups and thereafter reacting the second adduct having terminal NH₂ groups with formaldehyde.

References Cited in the file of this patent

UNITED STATES PATENTS

| | | |
|---|---|---|
| 2,625,532 | Seeger | Jan. 13, 1953 |
| 2,858,296 | Stilmar | Oct. 28, 1958 |
| 2,917,471 | Nelson | Dec. 15, 1959 |
| 2,929,800 | Hill | Mar. 22, 1960 |
| 2,987,504 | Wagner | June 6, 1961 |
| 3,021,307 | Csendes | Feb. 13, 1962 |

FOREIGN PATENTS

| | | |
|---|---|---|
| 848,965 | Great Britain | Sept. 21, 1960 |

OTHER REFERENCES

Freytag, German application F14136, printed June 7, 1956.